Feb. 6, 1951  S. A. STAEGE  2,540,301
PAPERMAKING MACHINE AND CONTROL THEREFOR
Filed July 30, 1945  4 Sheets-Sheet 1

INVENTOR
Stephen A. Staege
BY
Marechal & Biebel
ATTORNEYS

Feb. 6, 1951  S. A. STAEGE  2,540,301
PAPERMAKING MACHINE AND CONTROL THEREFOR
Filed July 30, 1945  4 Sheets-Sheet 2
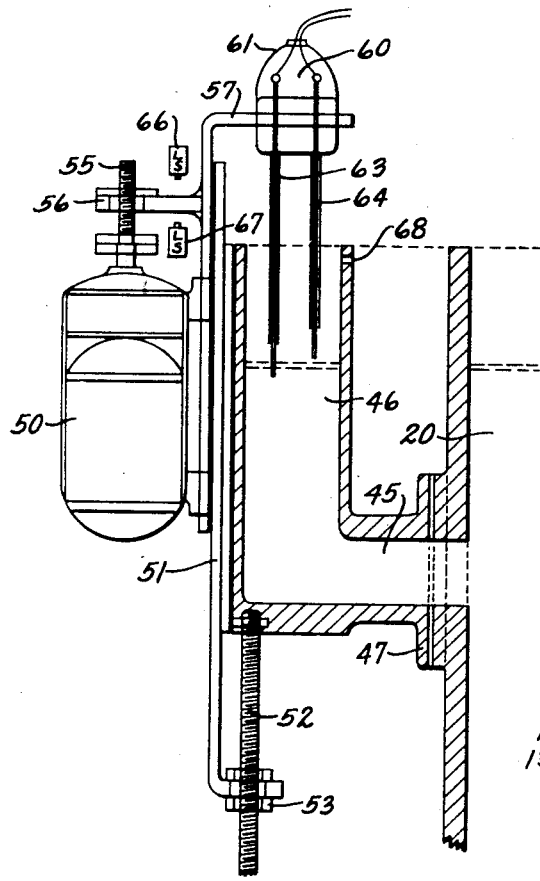
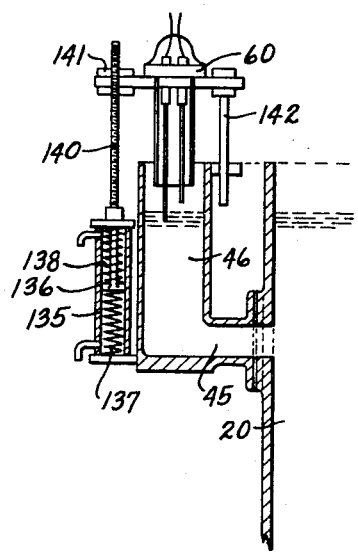
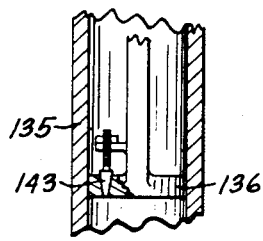
INVENTOR
Stephen A. Staege
BY
Marechal & Biebel
ATTORNEYS Feb. 6, 1951     S. A. STAEGE     2,540,301
PAPERMAKING MACHINE AND CONTROL THEREFOR
Filed July 30, 1945     4 Sheets-Sheet 3
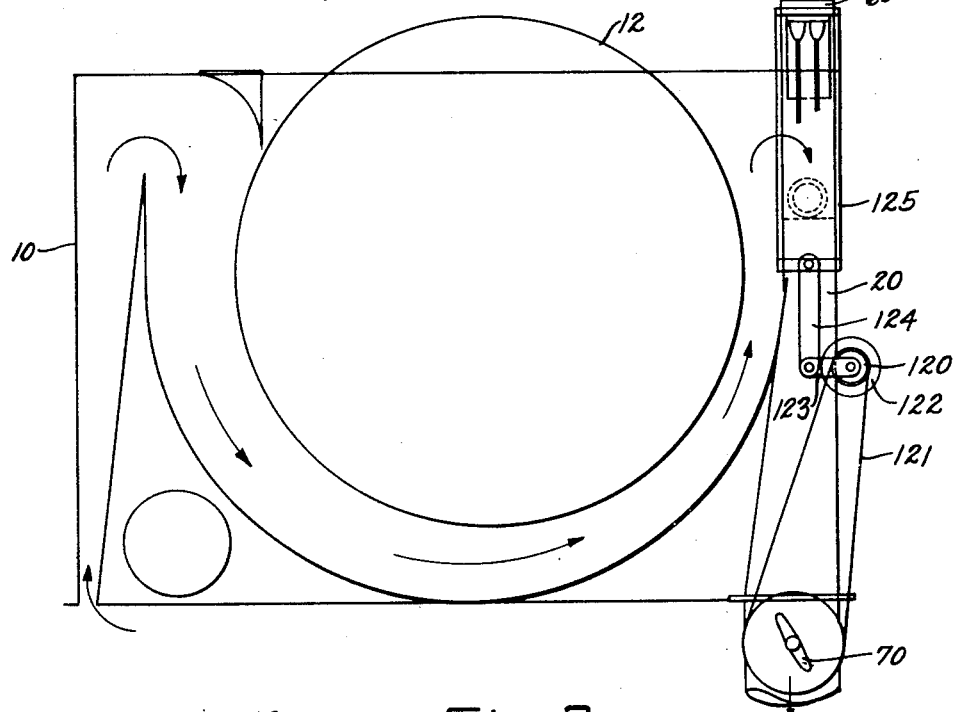
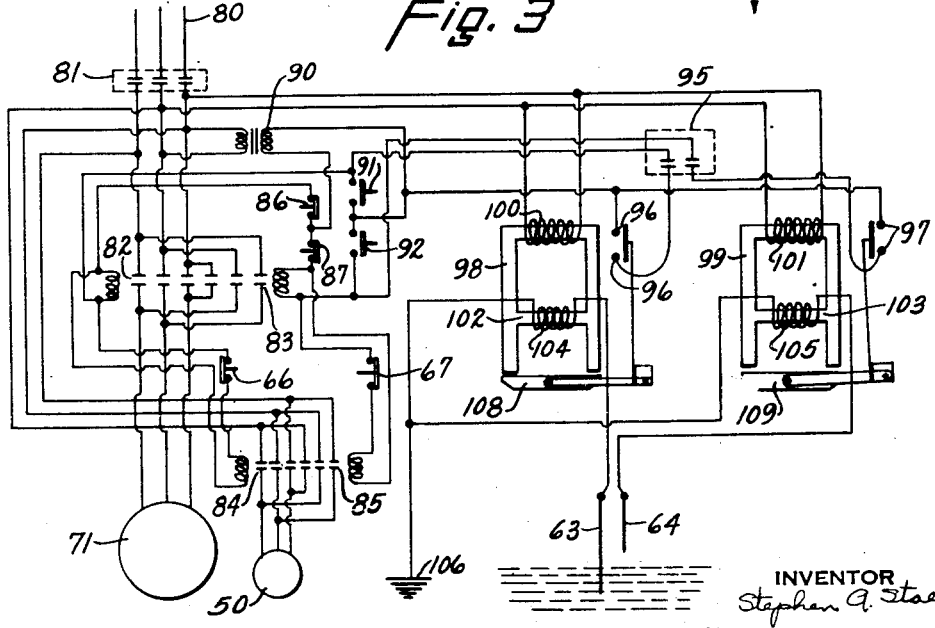
INVENTOR
Stephen A. Staege
BY
Marechal & Biebel
ATTORNEYS Feb. 6, 1951        S. A. STAEGE        2,540,301
PAPERMAKING MACHINE AND CONTROL THEREFOR
Filed July 30, 1945              4 Sheets-Sheet 4
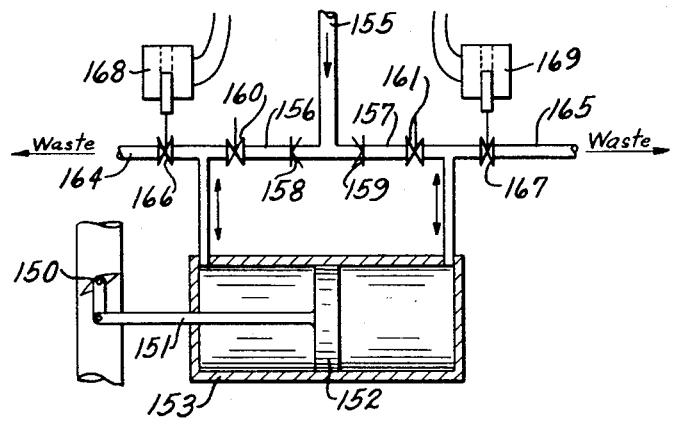
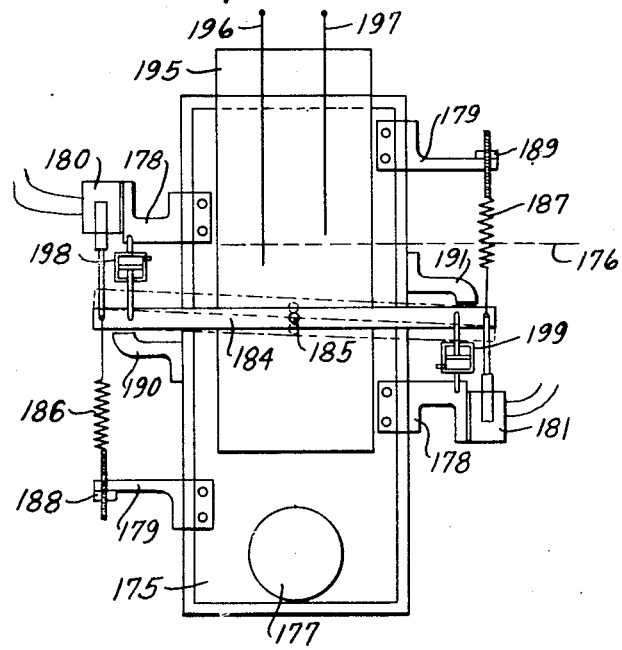
INVENTOR
Stephen A. Staege
BY
Marechal & Biebel
ATTORNEYS Patented Feb. 6, 1951

2,540,301

UNITED STATES PATENT OFFICE 2,540,301

PAPERMAKING MACHINE AND CONTROL THEREFOR

Stephen A. Staege, Hamilton, Ohio, assignor to The Black-Clawson Company, Hamilton, Ohio, a corporation of Ohio Application July 30, 1945, Serial No. 607,820

8 Claims. (Cl. 92—43)

This invention relates to paper manufacture and more particularly to controls therefor.

It is the principal object of the invention to provide paper making equipment incorporating a control for maintaining a predetermined liquid level or pressure therein which functions entirely automatically and in correlated relation with the entire system to establish and maintain the proper liquid level conditions within accurate limits and substantially free of objectionable overtravel, hunting or other fluctuations.

It is also an object to provide such a paper making system in which electrical controls provide for maintaining predetermined liquid levels and effect necessary adjustments rapidly and in proper amount to avoid such objectionable overtravel or hunting conditions, thereby maintaining the liquid levels accurately at the desired amount.

It is a further object to provide a liquid level control particularly adapted for a cylinder type of paper making machine in which a proper and predetermined level is maintained at all times notwithstanding other changes occurring in the system.

It is a still further object to provide such a control of the liquid level in a vat of the overflow type in which a predetermined liquid level is maintained in the overflow compartment to assure maintenance of predetermined desired paper forming characteristics while avoiding such splashing or cascading of the flow as to result in objectionable entrainment of air therein.

Other objects and advantages will be apparent from the following description, the accompanying drawings and the appended claims.

In the drawings:

Fig. 2 is a partial view partly in side elevation and partly in vertical section showing the apparatus for controlling the liquid level in the overflow compartment of the vat;

Fig. 3 is a circuit diagram showing the controls utilized for establishing and maintaining a predetermined liquid level in the vat;

Fig. 4 is a schematic view of a vat showing a modified form of adjusting mechanism for maintaining a predetermined liquid level;

Figs. 5 and 6 are similar schematic views showing a further modified form of regulating and adjusting mechanism to maintain predetermined liquid level conditions;

Fig. 7 is a detail view of the mechanism of Figs. 5 and 6;

Fig. 8 is a diagrammatic view showing the use of a fluid pressure motor for moving the main flow valve in response to the energization of solenoid control valves; and Fig. 9 is a diagrammatic view of the use of solenoids to effect movement of the electrode assembly.

Figure 1:
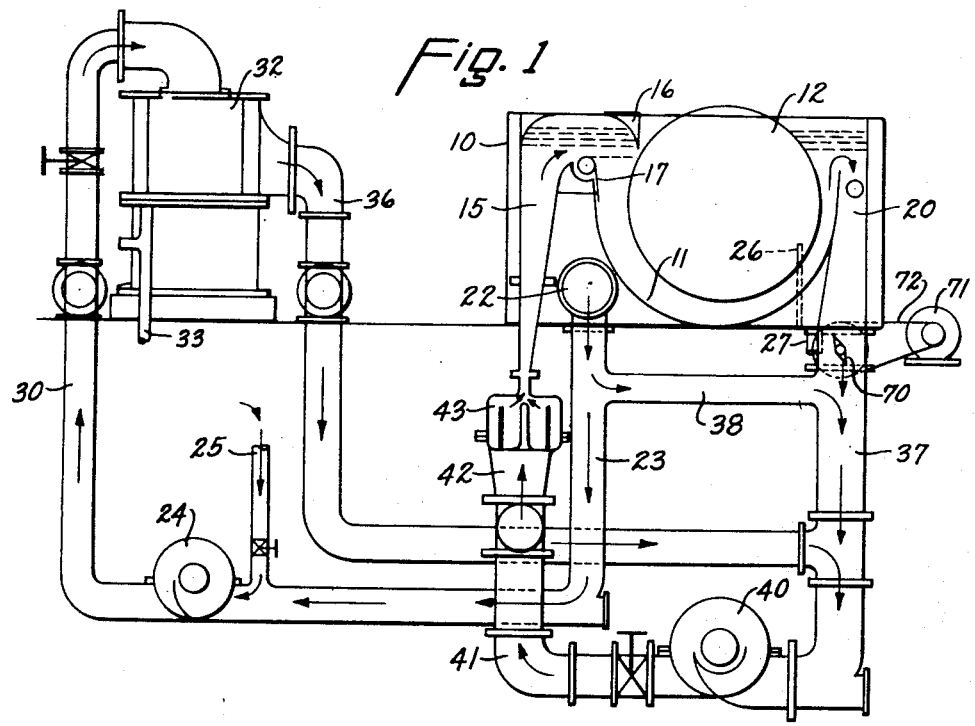
Fig. 1 is a schematic view of the circulating and supply system of a cylinder type paper machine showing the path of flow of incoming stock and collected white water as supplied to and discharged from the paper forming parts.

The invention is applicable to maintenance of liquid levels or liquid pressures for different types of paper making equipment, such for instance as to maintain a predetermined head or level of stock in the headbox of a Fourdrinier machine, or screen flow box, vat head box, or pressure in a tightly enclosed stock inlet and slice. For purposes of illustration however it will be described hereinafter more particularly with reference to the control of liquid levels in a vat containing a cylinder forming machine and such other applications will be understood from the following description and drawings.

The operating characteristics of the wet end of a paper making machine, and in particular a machine of the vat type, are quite complex, and the sequence of events taking place in operation is quite difficult to follow and understand fully. For example, the amount of stock fiber taken out of the vat continuously in the sheet is normally the same amount as the quantity of new stock fiber going into the vat, and the thickness and weight of the sheet being formed is a function of this quantity and the speed of the machine. The amount of water that has to be drained out through the face wire on the cylinder mold is a function of the quantity of stock coming into the vat, the consistency of the stock in the vat, the moisture in the sheet going out of the vat, and the additional water in the form of showers going into the vat, the speed of the machine also being an important factor.

The amount of mold head necessary to obtain the drainage under the existing conditions depends upon the quantity of water necessary to be drained out, the consistency of the stock, its freeness, and the manner in which the fibers are laid down on the face of the mold. Other factors such as temperature, viscosity, and the speed of the mold also have an effect.

In the case of the conventional simple counterflow vat, should there be a slight increase in freeness of the stock coming to the vat (which often happens due to variations in the wood from which the pulp is made, or variations in the refining processes) the drainage rate will tend to increase momentarily, increasing the amount of fiber formed up in the sheet and increasing the weight of the sheet. At the same time the white water level in the cylinder mold will be raised, causing more white water to be spilled over the spill dam to the sewer, decreasing the total quantity in the vat and thereby lowering the general level in the vat proper. This would continue until the level in the vat has been reduced to such a point that the level in the cylinder mold will have dropped sufficiently that only the normal amount of white water will be spilling over the spill dam. The increase in drainage causing more stock to be taken out of the vat than is coming in causes a reduction in the consistency of the stock in the vat which still further accelerates the drainage, tending to lower the level in the vat. In order to overcome this, the operator may either raise the level of the spill dam to bring up the level in the mold and the general level in the vat, or he may open the throttle valve in the discharge from the white water pump so as to take out a greater volume of white water, permitting the vat to operate at the higher freeness and at the lower resulting stock consistency necessarily following from the greater amount of water draining from the stock.

If a change in consistency takes place, as frequently occurs, somewhat similar but specifically different conditions occur. Correspondingly, if there is a slight change in the speed of the machine, a different set of variations will take place, or if the speed of the white water pump should vary, another complicated sequence of events will follow.

There are certain steps which can be taken to correct for these variations if the variations themselves cannot be immediately corrected, such as to raise or lower the height of the white water spill dam, to increase or decrease the valve opening in the white water pump or in the case of the overflow vat to increase or decrease the amount of stock overflowing and being extracted from the overflow compartment, and also to make such adjustments as are necessary to prevent cascading of the stock over the overflow dam.

Further, from the standpoint of the type of sheet formation required, additional factors are involved. For instance, with certain types of sheet and character of stock fibers the best results can be obtained when operating with a consistency of about .25% with a mold head of perhaps 24 inches, meaning that the white water spill dam will be set very low. For another type of sheet formation, character of stock, and degree of refining, the best results may be obtained by operating with a mold head of only 6 inches and a consistency of 1%. More often the mold head will be 10 to 12 inches with a consistency of the order of .5 to .6%, requiring a different setting level in the cylinder mold in each case, such level being slightly higher than the crest of the white water spill dam depending upon the amount of white water to be spilled.

In connection with the above variables, there is also considerable overlapping of effects and results so that it becomes quite difficult to carry through an accurate analysis of what is the individual cause and effect of each factor. To compensate and adjust for these many interrelated conditions by hand operation is difficult at best and requires the continuing attention of the operator, whereas the vat level control of the present invention establishes the necessary adjustments automatically and continuously, to keep the vat functioning in the proper manner at all times. The system of this invention is highly sensitive, so that it will respond quickly to even a relatively small change in liquid levels, and at the same time is so constructed and arranged that it is free of objectionable overtravel or hunting, and thus does not give rise to continuous changes or fluctuations where not required to maintain proper operating characteristics. Further, it is quite simple in construction and operation, relatively easy to maintain in a clean and proper operating condition, is relatively inexpensive and requires only limited space, and its operation may be readily observed and understood, thereby further simplifying the overall control. Further, it provides for maintenance of proper liquid level conditions while avoiding cascading of the stock and the resulting difficulties encountered with excessive air being entrained in the stock flow such as occurs where the level is maintained by an adjustable dam. Stock flowing over such a dam and falling therefrom tends to entrain air and as such stock is recirculated in the vat, the entrained air is released causing objectionable conditions both in the inlet and in the vat so that uniform forming conditions are interfered with. With the present invention such cascading and air entrainment are substantially avoided and the proper levels are maintained with a smooth and continuous stock flow.

As illustrating the necessity of a high degree of accuracy in the control of the flow conditions, and of the serious and rapidly cumulative effects of a departure from the correct rates of flow, the following may be given as an example. Assuming a vat from which there is a normal flow through the overflow compartment at the rate of 5,000 gallons per minute, it will be clear that a discrepancy between the outflow and the supply to the vat of as small an amount as one-tenth of one percent, will result in a discrepancy of flow of five gallons per minute. The volume of liquid in the vat at any instant being only a small part of the total volume of circulating liquid in the system, such flow, in a vat of conventional size, may cause a rise or fall of the vat level of approximately one half inch per minute, a condition which would be seriously objectionable and very quickly lead to wide variations and fluctuations in the liquid level and in the resulting sheet formation, unless properly corrected and regulated. It will be evident from this illustration that a high degree of accuracy in regulation is required, that correction for any changes must be made quickly but must not overtravel, and that the effects of any inaccuracies or flow discrepancies are exaggerated and cumulative. It will thus be seen that the regulating valve and its associated controls must provide for making very small regulating movements or increments, such movements being made quickly in response to changing liquid levels, and that at the same time the controls must also provide for rapidly making relatively large changes in response to manual control where the operator wishes to change the forming conditions.

Referring to the drawings, Fig. 1 shows schematically the circulating means for a vat system incorporating the present invention. The vat proper is shown at 10 having the vat circle 11 with the rotary forming member or cylinder mold 12 mounted therein. A tapered vat inlet 15 supplies the incoming stock, the usual mold slice 16 and the adjustable rotary slice 17 being provided as desired. The vat has an overflow compartment 20 with the overflow dam being lowered or removed since it is not utilized in accordance with the present invention as the means of maintaining vat level.

The white water is withdrawn through pick-up 22 located in the vat and is fed through conduit 23 into white water pump 24, new stock from the regulating box being introduced into conduit 23 from pipe 25 directly ahead of the pump 24. The level in the vat is maintained by the white water spill dam 26 shown in dotted lines in Fig. 1, the overflow from which may be discharged to the sewer as shown at 27.

The discharge of the white water pump is supplied through conduit 30 to a suitable screen 32, the reject from which is removed as shown at 33 and discharged. The screened stock is withdrawn through conduit 36 and is delivered into the conduit 37 which also receives the overflow from the overflow compartment 20. A branch conduit 38 provides for return of a portion of the white water directly into the stock overflow.

Circulating pump 40 delivers the stock through conduit 41 which is preferably branched at 42 to supply the stock to a counterflow inlet 43 which preferably is of the construction disclosed in Patent No. 2,347,717 assigned to the same assignee as this application. From the inlet 43 the stock is delivered to the vat inlet 15, and passes into the vat in the manner already described.

In order to maintain a predetermined level in the overflow compartment 20 of the vat, a conduit 45 opens into this compartment and connects with a liquid level chamber 46 which is thus in free and continuous communication with the liquid in the overflow compartment. The chamber 46 may be provided with a flange 47 by means of which it is secured to the side of the vat. A suitable power source such as a reversible gear head motor 50 is mounted in an upright position upon a base plate 51 which carries the electrode assembly 60 and is slidable vertically upon the outer wall of chamber 46. The vertical position of the plate and of the motor relative to the chamber are adjustable by means of a manually rotatable screw 52 seating within the lower wall of chamber 46, and over which there is received a nut 53 non-rotatably held thereon by means of the base plate 51. It will thus be evident that upon manual adjustment of screw 52, the base plate 51, the motor 50, and the electrode assembly may be raised or lowered to a predetermined position with respect to the chamber 46 and the liquid level therein.

The motor shaft 55 extends upwardly therefrom and has threaded engagement with a nut 56 non-rotatably held by bracket 57 which is vertically slidable upon base plate 51, suitable guide members being provided on the base plate to provide for such sliding movement.

The bracket 57 extends in overhanging relation across the upper end of chamber 46 and provides a support for an electrode assembly 60 including a cap 61 of rubber or similar insulating material, and a pair of electrodes 63 and 64, suitably enclosed in insulating tubes leaving only the lower ends exposed. As shown, the electrodes are of different lengths, electrode 63 being longer than electrode 64 by a predetermined amount.

Bracket 57 is adapted to be raised or lowered with respect to motor 50 and base plate 51 upon operation of the motor and is adapted to have only a limited travel relative thereto, any desired changes in the liquid level to which the control will regulate being effected by manual adjustment of screw 52. A pair of limit switches comprising upper switch 66 and lower switch 67 are arranged to engage a portion of the bracket and to open suitable control circuits when the bracket assembly has reached either limit of its travel.

In order to prevent stock fibers from accumulating in the chamber 46, a small flow of clean water is allowed to run into the chamber from a connection 68 supplied from a suitable source so that there will be a slight flow from the chamber 46 into the compartment 20, thus avoiding objectionable deposit of fibers in chamber 46. The connection 45 is preferably relatively large, such as a 2" pipe connection, so that any changes in the level in the compartment 20 are immediately reflected in chamber 46.

Suitable valve means 70 is provided in the lower end of the overflow discharge conduit, such means preferably being in the form of an adjustable butterfly valve. Provision is made for power operation of the valve, this mechanism as shown comprising reversible electric motor 71 operatively connected to cause rotation of the valve by belt or sprocket 72.

The normal operating condition is to hold the level in the overflow compartment nearly, if not quite, up to the level in the vat above the overflow dam, with the overflow dam lowered as far as desired since it no longer controls the level in the vat. The level control as herein provided establishes and controls the level both in the overflow compartment and also in the entire vat when the overflow dam is set low enough, this being the preferred condition for usual operation. In the case of the overflow vat, the quantity of liquid going over the overflow dam and discharging through the butterfly valve is relatively quite large in proportion to the storage capacity of the vat itself, this amount being so large that if the amount of stock approaching the overflow increases only a very small percentage it would be only a very brief time before the vat will overflow. It is important therefore, that the flow regulating valve move and respond quickly, but that it not travel so far that there will be destructive hunting and surging.

The control mechanism is shown diagrammatically in Fig. 3 where the valve motor 71 and the electrode adjusting motor 50 are connected for simultaneous operation and in corresponding directions with each other. Each motor is shown as energized from a three-phase source of power 80 through main control snap switch 81. Valve motor 71 is controlled through the provision of magnetic reversing switches 82 and 83. Electrode motor 50 is similarly controlled through the provision of magnetic reversing switches 84 and 85. As shown, the magnet coils for switches 82 and 84 are connected in parallel while the magnet coils for switches 83 and 85 are similarly connected in parallel. Suitable upper and lower valve limit switches 86 and 87 are connected in the circuit of both pairs of the reversing switches so that the control circuits of both the valve motor and the electrode motor will be deenergized when the valve 70 reaches either of its limiting positions thereby avoiding possibility of damage to the valve. In addition, separate limit switches 66 and 67 are provided in the circuit of the electrode motor only, thereby providing for terminating further adjusting movement of electrode motor 50 when the electrode assembly has been moved to either of its upper or lower limits of travel.

A control circuit for actuating the reversing switches is energized from the low voltage secondary of transformer 90, push buttons 91 and 92 providing for manual actuation of the respective reversing switches to provide for a rapid change of the electrode position and of the setting of the valve 70 when the operator wishes to establish a change in the forming conditions. It will be understood that it is only necessary for the operator to press either of the push buttons 91 or 92, and that the valve motor and the electrode motor will both continue to operate in a selected direction as long as the button is held, or until one or the other of the limit switches is opened.

For automatic control, a manual cut out switch 95 is closed, such switch in the open circuit position providing for the manual operation already described. The closing of switch 95 supplies energy to the contacts 96, 97 of relays 98 and 99, respectively. These relays have energizing coils 100 and 101 which are continuously energized from the power source and have intermediate magnetic bridges 102 and 103 which carry coils 104 and 105, respectively. One side of each of such coils is connected in common to a suitable ground 106 while the other sides are connected respectively to the two electrodes 63 and 64. Each relay has an armature 108 and 109, armature 108 providing for opening its contacts 96 when energized while armature 109 closes its contacts 97 when energized.

Energization of the respective armatures 108 and 109 is controlled in response to the opening or closing of a circuit through the respective coils 104 and 105, in accordance with the contact of the liquid in the chamber 46 with the respective electrodes 63 and 64. When, for example, the liquid is above and thus in contact with the longer electrode 63 but below and out of contact with the shorter electrode 64, a short circuit is established through relay coil 104 which causes the magnetic flux through bridge 102 to be diverted, resulting in the attraction of its armature 108 and the resulting opening of relay contact 96. The circuit through relay coil 105 is open, and the magnetic flux from this relay thus passes through its bridge 103, releasing armature 109, and maintaining contacts 97 in open circuit position.

As shown, relay contacts 96 control the energization of the magnet coils of switches 82 and 84, while relay contacts 97 control the energization of the magnet coils of switches 83 and 85. This is the normal condition when the liquid is at the desired level, resulting in the deenergization of both the valve motor and the electrode motor. In response to a rise in liquid level, a closed circuit through electrode 64 will be established, armature 109 of relay 99 will be attracted, closing its contacts 97 and energizing the reversing switches 83 and 85 to thereby cause adjusting travel of the valve motor in the direction to effect increased opening of the valve 70 in order to correct for the rise in liquid level, and at the same time energizing the electrode motor 50 in the direction to raise the electrode assembly and thus to break contact of electrode 64 with the liquid after a very limited opening movement of the valve to prevent overtravel and hunting. Such operations will be repeated with an interval between adjusting movements of the valve which will provide a time delay for the system to become stabilized at the new valve setting, and prevent the occurrence of excessive valve movement such as to over-correct for the change in level and cause instability.

Conversely, without further detailed analysis, it will be clear that upon a fall in the liquid level below the longer electrode 63, the circuit therethrough will be open, resulting in energization of the reversing switches 82 and 84 which will then cause adjustment of the setting of the valve in the direction toward closing, thus tending to raise the liquid level and simultaneously actuating the electrode motor in the direction to cause the lowering of the electrode assembly to reestablish contact of electrode 63 with the liquid within a short period of time, to thereupon deenergize the motors 50 and 71, stopping the movement of the valve after only a very limited change.

When operated by hand, and where, for example, it is desired to produce relatively large changes in the valve setting, the proper push button 91 or 92 is pressed to either open or close the valve, the electrode motor in such case running until it reaches its limit switch after which it is deenergized while the main valve motor continues to travel under such manual control until released or until it also reaches its limiting condition. This results in a slight overtravel of the valve, but it will be followed by a reversal of the operation of the valve motor and of the electrode motor, placing both of them in a stable and anti-hunting operating range. Under normal automatic operating conditions, the electrode motor does not move far enough to engage its limit switches and effective anti-hunting operation will thus result without overtravel of the valve, providing for maintaining an accurate level in the overflow compartment, and as a result, in the entire vat. Furthermore it will be understood that adjustment of the manual screw 52 will change the position of the regulating controls relative to the vat and thus provide for regulation of the liquid to a different level.

As examples of the operation of the system, the two electrodes may be arranged so that they differ in length by about ½ inch, the raising and lowering movements as above described continuing for approximately ⅛ inch before the adjusting motors are deenergized. The time required to effect such movement is relatively short, for example of the order of not more than a few seconds, so that only a slight change in the setting of the valve 70 is produced at each operation. During this limited time there is substantially no change of level in the vat, but the adjusting movement terminates quickly, and an opportunity is thus provided for the entire system to adjust itself to this new valve setting. If the change was not sufficient, the cycle will be repeated after a period of time during which the level in the entire system is affected, but the hunting tendency, and the possibility of fluctuations occurring over substantial ranges under the regulating action, are substantially eliminated. Movement of the valve 70 may occur every two or three minutes, or at intervals of 15 to 20 minutes, or even longer, as required to maintain the desired level conditions, the actual period of the adjusting movement being of short duration as described above. Very satisfactory results have been secured with such arrangement, maintaining the level uniform within limits of about ½ inch, more sensitive regulation being possible by closer adjustment of the mechanism if desired.

Referring now to Fig. 4, a somewhat modified construction is shown in which the electrode assembly 60 and the overflow control valve 70 are both actuated from a single power source with suitable mechanical connections therebetween. In this arrangement a single motor is shown at 120, having a drive 121 for effecting rotation of valve 70 in a manner similar to that described above. In addition, it is connected through a slip clutch 122 with a lever 123 to which a link 124 is connected, such link being articulated to the frame 125 on which the electrode assembly is mounted. Thus in response to rotation of motor 120 in either direction, a simultaneous and correlated movement of the valve and a raising and lowering of the electrodes, will occur to establish and maintain predetermined vat level conditions in the system as already described. The clutch 122 will slip when the limit of travel of the electrode assembly is reached, allowing the valve to continue to move without damage to the electrode assembly or its operating connection.

Figure 5:
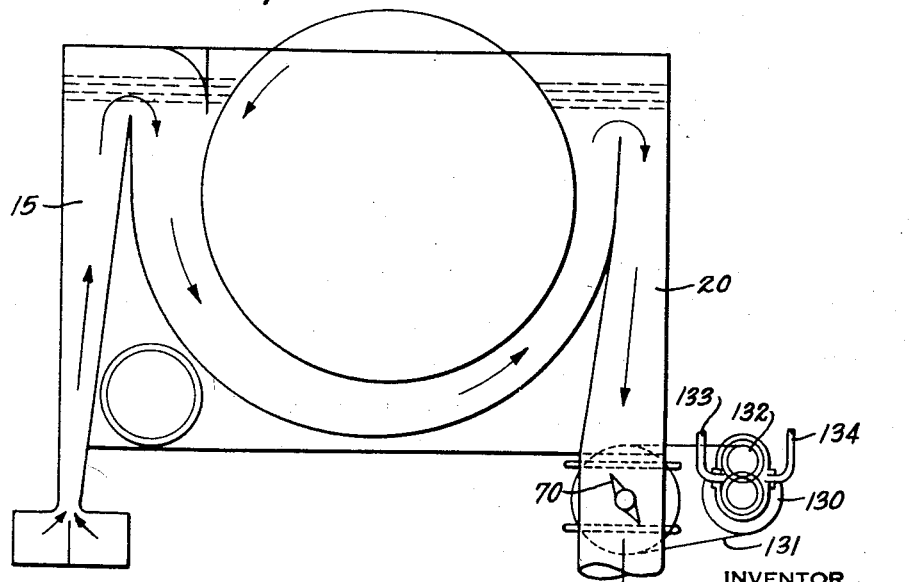

A further modified construction is shown in Figs. 5 to 7 in which a fluid motor source is provided for effecting the operating adjustments. In this form a single electric motor 130 is controlled in the same manner as described above, and is suitably connected as shown at 131 to cause selective adjustment in the setting of the liquid level control valve 70.

In addition the motor 130 drives fluid or hydraulic pump 132 which has connected thereto pipes 133, 134 leading to opposite ends of a cylinder 135 mounted adjacent the liquid level chamber 52. A piston 136 is mounted for axial travel in cylinder 135, and is normally urged toward a central neutral position therein under the action of springs 137 and 138 each of which acts to return the piston toward its neutral position when displaced. The piston rod 140 extends upwardly above the cylinder and has suitable connection at 141 with the electrode assembly 60, the assembly being guided for vertical movement by guide rods 142. A needle valve 143 is provided which may be located either in a bypass connection or in the piston as shown to allow a predetermined slow rate of flow of the fluid from one side of the piston to the other, thereby always allowing return of the electrodes to the normal mid-position. In other respects the system is constructed and functions in the manner already described.

In operation, and assuming a change in the vat level, the motor 130 starts up and changes the setting of valve 70 in the direction determined by the rise or fall of the liquid level. At the same time fluid is supplied to cylinder 135, at one side of piston 136, and withdrawn from the other side thereof, so that the piston is moved against the action of spring 137 or 138, to shift the position of the electrodes sufficiently to break the circuit established by the change, and to stop the operation of the pump. Upon such stoppage of the pump, the spring 137 or 138 which has been compressed continues to exert pressure upon the piston in the direction to return it toward neutral position, a small rate of flow of the liquid being permitted through the needle valve 143 and such leakage as may occur in the pump 132.

The piston is thus slowly returned to neutral position, returning with it the electrode assembly. The rate at which the electrodes will return to their normal position is determined by the leakage flow in the hydraulic system; through proper adjustment of the needle valve the time required for this return to neutral may be adjusted so that the piston and the electrodes would return to normal in from about ½ minute to 1 or 2 minutes, depending upon the time required for the level in the vat to accommodate itself to the new position. It will also be understood that the time required for such operation will vary with the original displacement of the piston from its neutral position, and that suitable release valves may be provided to permit the fluid to be discharged from one side of the pump to the other as the pressure builds up in the course of an adjusting movement should the piston approach its extreme limit of travel in either direction.

The hydraulic control as herein provided has certain advantages in that it does not have a drooping characteristic, but will regulate for a constant level regardless of flow. Likewise the return of the electrodes to a predetermined neutral position after a limited period of time is advantageous for control purposes as affording a sufficient opportunity for the system to adjust itself to new operating conditions.

In place of utilizing one or more electric motors as the power energizing source for effecting adjustment of the setting of the valve and of the position of the electrode assembly, other types of power such as a fluid pressure means may be utilized for controlling the setting of the flow controlling valve. Such an arrangement is shown in Fig. 8 in which there is a somewhat diagrammatic showing of such apparatus. As there shown, the valve 150 corresponds to the valve 70 in the overflow conduit, being positioned at a suitable point in the system to provide for properly controlling the flow or pressure characteristics as desired. The valve is actuated by a piston rod 151 connected to a double acting piston 152 operable in cylinder 153. The source of fluid pressure is indicated at 155, such pressure being continuously supplied through branch conduits 156 and 157 respectively. Check valves 158 and 159 prevent return flow of liquid in the respective conduits, and needle valves 160 and 161 control the flow from the conduits into the respective sides of the system, providing a predetermined pressure loss or drop in response to flow of fluid therethrough. Waste pipes 164 and 165 are connected to opposite sides of the piston and are controlled by shut-off valves 166 and 167 respectively each of which is actuated by a solenoid 168, 169.

In operation, and assuming the electrode assembly to be in its normal or neutral position, both solenoids 168 and 169 are deenergized, leaving valves 166 and 167 closed. Under these conditions fluid supplied through conduit 155 is made effective upon opposite sides of piston 152 with equal pressure to hold the same in predetermined stationary position.

The solenoids 168, 169 are connected in place of the two windings of the valve motor 50 as above described so that upon operation of one or the other of the reversing switches shown in Fig. 3, the proper solenoid is energized. This occurs upon a change in the liquid level and the corresponding valve 166 or 167 is opened, reducing the pressure on one side of the piston while the full pressure remains effective upon the opposite side. It will be understood that while there is some flow through needle valve 160 or 161 associated with the open waste valve, the pressure on that side of the needle valve will be substantially reduced and there will thus be a resulting travel of the piston in the desired direction. Upon reestablishment of normal relations between the electrode assembly and the liquid level, the opened waste valve will be closed and the system will again be held in fixed relation at the new valve setting.

As also indicated, the adjustment of the electrode assembly may conveniently be effected under solenoid control. In this form of the invention shown in Fig. 9 the electrode chamber is indicated at 175 with the normal liquid level represented by line 176, suitable connection to the vat or other chamber being made by connection 177. A pair of brackets 178, 179 are mounted on opposite sides of the chamber 175, and in relatively inverted relation to each other upon opposite sides. Brackets 178 support solenoids 180, 181, the movable portions of which are connected to opposite ends of a rockarm 184 mounted for rocking movement upon the chamber, being guided by pins 185. Springs 186, 187 engage opposite sides of the rockarm 184 and tend to turn it to a horizontal position where it engages with stops 190, 191 fixed to the side of chamber 175, these springs being shown as adjustable by means of the threaded rods engaging in nuts 188 and 189.

The electrode assembly is indicated at 195 and is supported upon the rockarm 184 in such position that it pivots with the rockarm, thereby effecting a relative raising or lowering of the electrodes 196 and 197 with respect to the liquid level 176.

A pair of dash pots 198 and 199 are connected between the rockarm 184 and brackets 178, respectively, providing for a predetermined delay in the return of the rockarm to its neutral position following a displacement thereof.

In operation, when the liquid level changes from its normal position where the longer electrode is submerged and the shorter one free of contact, one or the other of the control circuits is energized to effect energization of either solenoid 180 or solenoid 181, simultaneously with the energizing of the selected one of the waste valve solenoids 168 and 169. This causes either a raising of the one end of lever 184 to the upper dotted line position assuming solenoid 180 to be energized, or the lowering of the lever arm to the lower dotted line position assuming solenoid 181 to be energized. There is a corresponding movement of the electrode assembly in the proper sense to open the control circuit so that it will not remain closed for more than a short time, thus avoiding objectionable overshooting with respect to shifting the flow controlling valve 150.

When however the circuit has been opened by the displacement of the electrode assembly as just described, arm 184 is not immediately returned to its neutral position but is allowed to return only slowly and with a predetermined time delay, under the control of the respective dash pot 198 or 199. Thus with this arrangement a control change is effected in the setting of the valve, and thereafter there is a period of time provided within which the system can readjust itself to the new valve setting before the electrode assembly is again effective. This delay is desirable particularly in a system of the character described herein where there is a large total mass of recirculating fluid which has an inertia effect with regard to regulation of the rates of flow. It is found that this feature is desirable as substantially reducing the tendency toward hunting or overshooting, and providing for more accurate regulation. Such arrangement is also advantageous in that it has a definite predetermined level condition to which it regulates, is substantially free of a drooping characteristic, and provides for regulation to a substantially constant level regardless of flow conditions. Suitable manual adjustments of the overall relation of the control assembly and the liquid level chamber may be effected as already described to provide for establishment of different selected levels.

The foregoing description has been developed with particular reference to the control of the overflow from a vat type of paper making machine in which a valve means was provided to regulate the flow from the overflow compartment. The invention may be similarly utilized in vats other than the overflow type, such as the conventional counterflow vat in which the control may be obtained by throttling the supply from the white water pump to maintain a predetermined inlet level or pressure. Also the control may be utilized to maintain a predetermined level or pressure in a screen flow box, a vat flow or mix box, the head box of a Fourdrinier machine, or to maintain a predetermined pressure in an enclosed stock inlet.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. Paper making apparatus comprising a forming member adapted to operate under a predetermined liquid level, means for supplying stock to said forming member and for collecting the white water therefrom and recirculating the same, a valve for regulating the flow to vary said liquid level, means responsive to a change in said liquid level, means including a power actuated drive controlled by said responsive means for concurrently changing the setting of said valve and moving said responsive means relative to said liquid level to effect discontinuance of further adjusting movement, and an additional control for changing the normal position of said responsive device independently of the level of said liquid relative to said liquid level to effect regulation to a different level.

2. A level control for a paper making system having a forming member therein adapted to operate under a predetermined liquid level comprising means for supplying stock to said forming member and for collecting and recirculating the white water therefrom, a valve for regulating the flow to vary said liquid level, means responsive to a change in said liquid level having a normal position, means including a control adapted to be actuated upon change of said liquid level relative to said normal position, means including a power actuated drive controlled by said control for effecting concurrent adjusting movement of said valve and displacing movement of said responsive means away from its said normal position, and means for effecting gradual return of said responsive means to its said normal position providing a time delay for readjustment of the conditions within said vat.

3. Paper making apparatus of the character described comprising a forming member adapted to operate under a predetermined desired condition of liquid level, means for supplying stock in liquid suspension to said forming member and for recirculating the white water and overflow therefrom, a chamber spaced from said forming member and having a liquid level therein which varies in corresponding relation with that effective upon said forming member, adjustable means for varying the liquid level effective upon said forming member, means including an electrical control for sensing the liquid level in said chamber, means including a power actuated drive for operating said varying means and for moving said sensing means vertically relative to said liquid level to discontinue operation of said varying means, and means including an operative connection between said drive and said sensing means for effecting actuation of said drive upon a change in said liquid level.

4. Paper making apparatus of the character described comprising a forming member adapted to operate under a predetermined desired condition of liquid level, means for supplying stock in liquid suspension to said forming member and for recirculating the white water and overflow therefrom, a chamber spaced from said forming member and having a liquid level therein which varies in corresponding relation with that effective upon said forming member, adjustable means for varying the liquid level effective upon said forming member, an electrode assembly for sensing the level of the liquid in said chamber, power operated means for simultaneously adjusting said level varying means and shifting the position of said electrode assembly relative to said liquid level, and means controlled by said electrode assembly for energizing said power operated means in response to a change in said liquid level.

5. Paper making apparatus of the character described comprising a forming member adapted to operate under a predetermined desired condition of liquid level, means for supplying stock in liquid suspension to said forming member and for recirculating the white water and overflow therefrom, a chamber spaced from said forming member and having a liquid level therein which varies in corresponding relation with that effective upon said forming member, adjustable means for varying the liquid level effective upon said forming member, means for effecting adjustment of said varying means including an electrode assembly for sensing the level of the liquid in said chamber, means having a neutral position for effective the shifting of said electrode assembly relative to said liquid level, power operated means for simultaneously adjusting said level varying means and causing the shifting of said electrode assembly away from said neutral position, control circuits actuated in response to contact of said electrode assembly with the liquid level for selectively actuating said power operated means, and means for effecting the gradual return of said electrode assembly to its said normal position following each shifting therefrom.

6. Paper making apparatus of the character described comprising a forming member adapted to operate under a predetermined desired condition of liquid level, means for supplying stock in liquid suspension to said forming member and for recirculating the white water and overflow therefrom, a chamber spaced from said forming member and having a liquid level therein which varies in corresponding relation with that effective upon said forming member, adjustable means for varying the liquid level effective upon said forming member, a pair of electrodes of different length within said chamber the longer one only of which is adapted to be in contact with the liquid therein in the normal position of said liquid level, control circuits selectively actuated in response to change in the number of electrodes in contact with said liquid, and power actuated means under control of said control circuits for selectively adjusting said level varying means and concurrently shifting said electrode assembly vertically to correct for said adjusting movement to maintain said predetermined desired liquid level.

7. Paper making apparatus of the character described comprising a forming member adapted to operate under a predetermined desired condition of liquid level, means for supplying paper making stock to said forming member, said stock supplying means including a chamber wherein the level of stock varies in corresponding relation with the level effective upon said forming member, means for regulating said effective level, drive means for operating said regulating means, control circuits for said drive means, an electrode assembly in said control circuits including a pair of electrodes of different effective lengths, means for mounting said assembly with said electrodes in sensing relation with the level of liquid in said chamber, means for varying the effective height of said assembly relative to said liquid level, and means controlled by said control circuits for operating said varying means to effect variation of the height of said assembly relative to said liquid level concurrently with the operation of said drive means for causing discontinuance of the operation of said drive means after a predetermined time interval.

8. Paper making apparatus of the character described comprising a forming member adapted to operate under a predetermined desired condition of liquid level, means for supplying paper making stock to said forming member, said stock supplying means including a chamber wherein the level of stock varies in corresponding relation with the level effective upon said forming member, means for regulating said effective level, drive means for operating said regulating means, control circuits for said drive means, an electrode assembly in said control circuits including a pair of electrodes of different effective lengths, means for mounting said assembly with said electrodes in sensing relation with the level of liquid in said chamber, power operated means for varying the effective height of said assembly relative to said liquid level, manually adjustable means for changing the setting of said electrode assembly relative to said chamber to effect the establishment of a different liquid level therein, and means controlled by said control circuits for operating said varying means to effect variation of the height of said assembly relative to said liquid level concurrently with the operation of said drive means for causing discontinuance of the operation of said drive means after a predetermined time interval.

STEPHEN A. STAEGE.

REFERENCES CITED

The following references are of record in the file of this patent:

UNITED STATES PATENTS

| Number | Name | Date |
|---|---|---|
| 1,590,607 | Taylor | June 29, 1926 |
| 1,961,893 | Wadman et al. | June 5, 1934 |
| 2,001,208 | Minskey et al. | May 14, 1935 |
| 2,032,016 | Hitner | Feb. 25, 1936 |
| 2,051,180 | Ruzicka | Aug. 18, 1936 |
| 2,110,313 | Warrick | Mar. 8, 1938 |
| 2,318,066 | Dodd | May 4, 1943 |
| 2,347,717 | Staege | May 2, 1944 |
| 2,354,945 | Cohen et al. | Aug. 1, 1944 |
| 2,354,964 | Ostermann et al. | Aug. 1, 1944 |
| 2,394,220 | Wagner | Feb. 5, 1946 |

FOREIGN PATENTS

| Number | Country | Date |
|---|---|---|
| 435,441 | Great Britain | Sept. 20, 1935 |